United States Patent Office 3,344,214
Patented Sept. 26, 1967

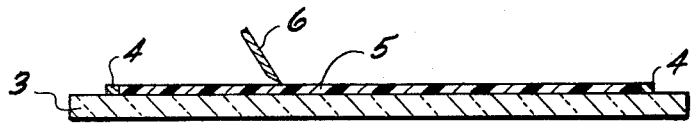
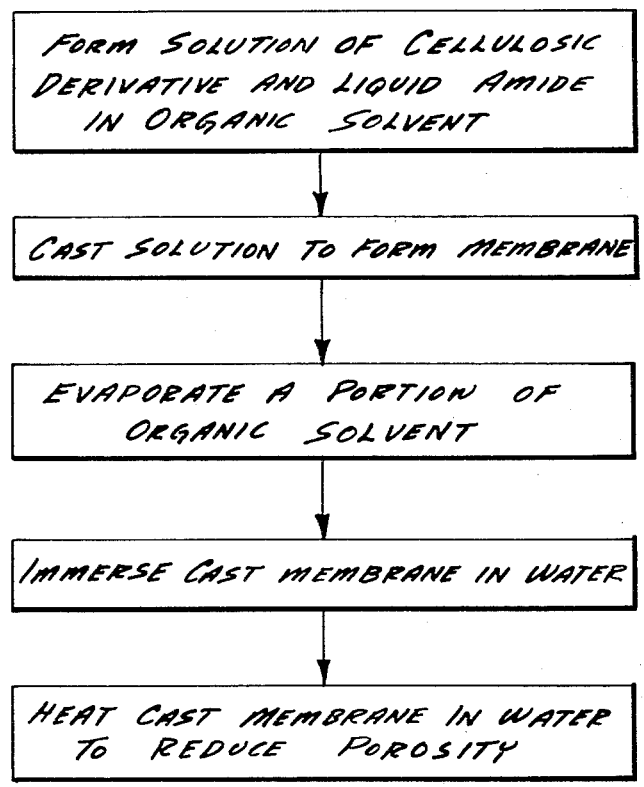

3,344,214
METHOD OF PREPARING A SEMIPERMEABLE MEMBRANE
Serop Manjikian and Sidney Loeb, Los Angeles, and Joseph W. McCutchan, Encino, Calif., assignors to The Regents of the University of California, Berkeley, Calif., a corporation
Filed Mar. 25, 1964, Ser. No. 354,775
13 Claims. (Cl. 264—41)

In general, the present invention relates to an improved method of preparing a semipermeable membrane adapted to permit substantially selective diffusion therethrough of a component of a solution. More particularly, this invention relates to a membrane adapted to recover fresh water from a salt solution, such as sea water. The method of the present invention incorporates improvements over the method disclosed in applicants' copending applications, specifically, High Flow Porous Membranes for Separating Water from Saline Solutions, Ser. No. 72,439, filed November 29, 1960, now Patent No. 3,133,132; Fresh Water Recovery, Ser. No. 197,609, filed May 25, 1962; Method of Forming Porous Membranes, Ser. No. 304,228, filed August 23, 1963, now Patent No. 3,283,042; and Improved Method of Forming Porous Membranes, Ser. No. 304,243, filed August 23, 1963.

The Federal Government has embarked on an extensive research program to solve the problem of recovering fresh water economically from saline water, such as sea water or brackish subsoil water bodies. Such research program has evolved many methods for recovering fresh water from sea water. To date, however, no recovery method has been made sufficiently economical. Most methods of fresh water recovery from saline solutions involve the transfer of heat under thermodynamically irreversible conditions, so that the process as a whole is unavoidably inefficient. In addition, in order to attain the high rate of heat flow necessarily required, the saline solutions are normally handled at relatively high temperatures which results in sever corrosion and scale problems. Also, the heat transfer approach normally requires a large number of stages in series to increase heat economy so that a large amount of equipment and much operational maintenance is required.

The membrane produced by the method of the present invention may be utilized in a simple process which can be made to approach thermodynamic reversibility to produce potable water (less than 500 p.p.m. dissolved solids) from a sea water brine containing solids in considerably greater concentration than is found in sea water in a single step. As described in the aforementioned copending applications, when salt water is pushed against a membrane, such as the one produced by the method described in the present application, under a hydraulic pressure somewhat greater than the osmotic pressure of the salt solution (approximately 350 p.s.i. for a fresh water-sea water interface), a reverse osmosis appears to occur and fresh water flows through the membrane from the saline water side. However, the production of membranes useful in such simplified process for the recovery of fresh water has to date been hampered by the number of special treating steps usually required to produce membranes of the highest efficiency. Also, only a relatively limited range of materials to date have been found useful in the production of such membranes. In addition, the membranes produced by the earlier processes frequently had regions of inhomogeneity which, although they did not influence the reverse osmosis performance of the membrane, they did apparently constitute regions of lesser physical strengths which could significantly affect the durability of the membrane.

Consequently, an object of the present invention is a method of producing membranes for a reverse osmosis process with fewer and simpler treating steps.

Another object of the present invention is a method of producing an improved membrane which results in a high production rate of fresh water therethrough with the fresh water salt content being very low.

Another object of the present invention is a method of producing membranes for a reverse osmosis process from a wider range of materials.

Still another object of the present invention is a method of producing membranes at ambient temperatures having a clear, colorless and homogeneous structure with high performance characteristics.

Other objects and advantages of the present invention will be readily apparent from the following description and examples which illustrate an exemplary embodiment of the present invention.

In general, the present invention involves a method of preparing a semipermeable membrane adapted to permit substantially selective diffusion therethrough of a component of a solution. The method of the present invention involves forming a solution containing a cellulosic derivative from the class consisting of ester and ether cellulosic derivatives having the formula

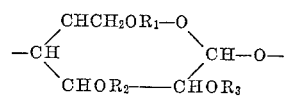

wherein $R_1$, $R_2$ and $R_3$ are members of a group consisting of $R_4$ and $CR_5O$, wherein $R_4$ is an alkyl group containing 1 to 8 carbon atoms and $R_5$ is an alkyl group containing 1 to 7 carbon atoms. Also contained in such solution may be the single additional component comprising a substantially water-soluble liquid amide having the formula

wherein $R_6$ is from the class consisting of hydrogen, methyl and ethyl groups and $R_7$ and $R_8$ are from the class consisting of hydrogen, methyl, ethyl and propyl groups without both $R_7$ and $R_8$ being hydrogen. Alternatively, the solution may contain a substantially water-soluble liquid amide having the formula $R_6CONR_7R_8$ and $R_6$ is from the class consisting of hydrogen, methyl and ethyl groups and $R_7$ and $R_8$ are from the class consisting of hydrogen, methyl, ethyl and propyl groups and an organic solvent. The solution is then cast to form a membrane and then a portion of the liquid amide and organic solvent, if present, are evaporated for a predetermined period of time. Then, the cast membrane is immersed in water. Finally, the cast membrane is heated to reduce its porosity. It should be noted that the terms "porosity" and "permeable" as used in the present application refer only to the fact that the membrane has a structure which allows the selective flow therethrough of an appreciable rate of fresh water under suitable conditions.

The film-forming material utilized in the method of the present invention is a cellulosic derivative from the class consisting of ester and ether cellulosic derivatives having the formula

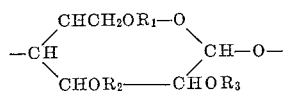

wherein $R_1$, $R_2$ and $R_3$ are members of a group consisting of $R_4$ and $CR_5O$, wherein $R_4$ is an alkyl group containing 1 to 8 carbon atoms and $R_5$ is an alkyl group containing 1 to 7 carbon atoms. Specific examples of such cellulosic derivatives are cellulose acetate, cellulose acetate-butyrate, cellulose propionate and ethyl cellulose.

The substantially water-soluble liquid amide which may be utilized in the present invention has the formula $R_6CONR_7R_8$ wherein $R_6$ is in the class consisting of hydrogen, methyl and ethyl groups and $R_7$ and $R_8$ are from the class consisting of hydrogen, methyl, ethyl and propyl groups. When such liquid amide is used in conjunction with an organic solvent to form the casting solution, $R_7$ and $R_8$ may both be hydrogen, as well as $R_6$, i.e., the amide may be formamide, while when using the liquid amide alone either $R_7$ or $R_8$ should be a methyl or larger carbon-containing group. Specific examples of such liquid amides are formamide, dimethyl formamide, methyl formamide and ethyl formamide. When using the liquid amide alone in conjunction with the cellulosic derivative, the weight ratio of the liquid amide to cellulosic derivative in the casting solution is in the range of about 2/1 to 4/1, with the ratio of 3/1 being preferred. When using both a liquid amide and an organic solvent with the cellulosic derivative, the concentration of the cellulosic derivative in said solution is in the range of about 20% to 30% by weight and the liquid amide has a concentration in the range of about 10% to 40% by weight. It should be noted that in either case no water need be added to the casting solution, although the addition of water to the casting solution does not have an adverse effect. Finally, it should be noted that the preferred organic solvent is acetone because of the unusually good results obtained therewith. However, other organic solvents, such as those noted in the earlier copending applications, may be utilized along with organic solvents, such as dioxane and tetrahydrofuran.

As noted in the earlier copending applications such as United States Patent No. 3,283,042, and as illustrated in the drawings appended hereto wherein FIGURE 1 is a schematic cross section of casting apparatus suitable for performing the process of the invention and FIGURE 2 is a flow sheet in highly schematic form generally outlining the steps of an example of the process, after forming the casting solution, it is poured onto a glass plate 3 between 0.010 inch thick side runners 4 to give this thickness to the as-cast film 5. The film 5 is then cast by passing an inclined knife 6 across the glass plate 3 which rests on the side runners 4 and which has a back wall and containers storing an excess of the casting solution. The inclined knife is then preferably pulled across the plate at a predetermined slow rate. For example, when the length of the plate is about 8 inches, the traverse of the knife required is normally accomplished in the range of about 0.13 to 0.25 minute without substantially affecting the results. Too slow a period of time permits excessive evaporation, while too fast a traverse time results in an imperfect surface formation and even possibly rupture the film. Then a portion of the liquid amide and the organic solvent, if present, are evaporated for a predetermined period of time measured from the beginning of the casting process. The casting and evaporation of the membrane may be carried out at a temperature as low as −10° C. in order to prolong the evaporation period, but, preferably, is conducted at ambient temperatures, such as 22–23° C. When utilizing the casting solution including the cellulosic derivative, liquid amide and organic solvent, the time period for such evaporation is in the range of about ¼ to 15 minutes and such time period is inversely proportional to the temperature at which the membrane is cast and evaporated. In other words, for time periods when the casting and evaporation are done at room temperature, the time period is about ¼ to 3 minutes, while when casting and evaporating at 14° F., the time period is 3 to 15 minutes. However, when only a cellulosic acetate derivative and a liquid amide are used in the casting solution, the time period for evaporation is about 4 to 15 minutes when conducted at ambient temperatures.

After such evaporation period, the film is then removed from the glass plate and immersed in water. If such immersion is done in ice water, the immersing period is usually about one hour. Then the film is heated in water for, usually, about 4 minutes at a predetermined temperature. Such heating temperature in the case of the membrane formed from the casting solution of a cellulosic derivative, liquid amide and organic solvent is in the range of about 23° C. to 95° C., while in the case of membranes formed from casting solutions of cellulosic derivative and liquid amide only, the heating temperature is in the range of about 70° C. to 95° C.

After such preparation, the membrane is ready for use by utilizing the side of the membrane which was away from the glass during the casting toward the brine solution from which fresh water is to be recovered. A brine containing 0.5% sodium chloride in tap water is applied to the membrane under an operating pressure of about 600 p.s.i.g. utilizing the type of apparatus set forth in the earlier copending applications. The production rate of fresh water and the salt content of the fresh water so produced were then measured under such operating conditions. The test results from such operation are set forth in Table I for the various compositions of the present invention.

TABLE I

| Casting Solution Composition | | | Evaporation Period (Minutes) | Casting and Evaporation Temp., °F. | Heating Temp., °C. | Desalinized Water | |
|---|---|---|---|---|---|---|---|
| Acetone, Percent | Formamide, Percent | Cellulose Acetate, Percent | | | | Flux, gal./ft.² day | Salt Content, p.p.m. |
| 66.7 | 11.1 | 22.2 | 10 | 14 | 73 | 11.6 | 306 |
| 64.4 | 14.2 | 21.4 | 10 | 14 | 73 | 29.7 | 612 |
| 57.8 | 11.1 | 31.1 | 10 | 14 | Unheated | 6.5 | 884 |
| 65 | 10 | 25 | 10 | 14 | 68.5 | 4.6 | 272 |
| 55 | 20 | 25 | 10 | 14 | 77 | 17.0 | 221 |
| 50 | 35 | 25 | 6 | 14 | 79.5 | 27.0 | 476 |
| 45 | 30 | 25 | 6 | 14 | 81.5 | 21.6 | 187 |
| 40 | 35 | 25 | 3 | 14 | 85.3 | 13.8 | 153 |
| 54.1 | 16.7 | 29.1 | 1 | Ambient | Unheated | 2.7 | 306 |
| 55.7 | 14.3 | 30.0 | 1 | Ambient | Unheated | 8.1 | 408 |
| 40 | 35 | 25 | ¼ | Ambient | 79.3 | 32.7 | 374 |
| 45 | 30 | 25 | 1 | Ambient | 74.0 | 30.0 | 408 |
| 50 | 25 | 25 | 1 | Ambient | 71.5 | 15.4 | 272 |
| 55 | 20 | 25 | 1 | Ambient | 65.0 | 15.1 | 357 |
| 45 | 30 | 25 | ¼ | Ambient | 71.3 | 83.7 | 1,870 |
| 45 | 30 | 25 | ½ | Ambient | 71.6 | 47.3 | 646 |
| 45 | 30 | 25 | 1 | Ambient | 71.0 | 25.6 | 578 |
| 45 | 30 | 25 | 1.5 | Ambient | 71.0 | 33.8 | 731 |
| 45 | 30 | 25 | 2 | Ambient | 71.6 | 25.1 | 1,105 |
| 45 | 30 | 25 | 2.5 | Ambient | 71.5 | 22.7 | 1,190 |
| 45 | 30 | 25 | 3 | Ambient | 71.5 | 25.1 | 1,700 |
| 45 | 30 | 25 | ¼ | Ambient | 76.5 | 41.6 | 493 |
| 45 | 30 | 25 | ½ | Ambient | 76.4 | 30.8 | 272 |
| 45 | 30 | 25 | 1.5 | Ambient | 74.7 | 23.0 | 272 |
| 45 | 30 | 25 | 1 | Ambient | 23.0 (Unheated) | 97.0 | 3,740 |
| 45 | 30 | 25 | 1 | Ambient | 68.5 | 44.6 | 1,054 |
| 45 | 30 | 25 | 1 | Ambient | 74.0 | 30.0 | 408 |

TABLE I—Continued

| Casting Solution Composition | | | Evaporation Period (Minutes) | Casting and Evaporation Temp., °F. | Heating Temp., °C. | Desalinized Water | |
|---|---|---|---|---|---|---|---|
| Dioxane, Percent | Formamide, Percent | Cellulose Acetate, Percent | | | | Flux, gal./ft.² day | Salt Content, p.p.m. |
| 56 | 24 | 20 | 6 | Ambient (73) | 75.5 | 37 | 1,156 |
| 56 | 24 | 20 | 6 | Ambient | 79.0 | 33.5 | 765 |
| 56 | 24 | 20 | 6 | Ambient | 83.0 | 25.6 | 544 |
| Tetrahydrofuran, Percent | Formamide, Percent | Cellulose Acetate, Percent | | | | | |
| 55 | 25 | 20 | ½ | Ambient | 71.0 | 4.1 | 629 |
| 65 | 20 | 15 | 4 | 14 | 73.0 | 4.3 | 680 |
| Acetone, Percent | Dimethyl Formamide, Percent | Cellulose Acetate, Percent | | | | | |
| 64.3 | 21.4 | 14.3 | 3.5 | Ambient (73) | Unheated | 12.4 | 561 |
| 25% Mg(ClO₄)₂ in H₂O, Percent | Dimethyl Formamide, Percent | Cellulose Acetate, Percent | | | | | |
| 9.1 | 72.7 | 18.2 | 8 | 14 | 91.6 | 37.3 | 2,125 |
| 9.1 | 72.7 | 18.2 | 8 | 14 | 94.0 | 14.8 | 646 |
| ----- | 75 | 25 | 8 | Ambient | 87.2 | 55.6 | 1,870 |
| ----- | 75 | 25 | 8 | Ambient | 88.7 | 33.8 | 1,445 |
| ----- | 75 | 25 | 8 | Ambient | 93.0 | 10.8 | 136 |
| ----- | 75 | 25 | 12 | Ambient | 87.2 | 43.2 | 1,360 |
| ----- | 75 | 25 | 12 | Ambient | 88.7 | 27.5 | 1,190 |
| ----- | 75 | 25 | 12 | Ambient | 92.7 | 8.9 | 136 |

As noted above, a portion of the liquid amide and organic solvent, if present, is evaporated during the evaporation period. However, it is to be emphasized that although evaporation does take place during such time period it would appear that other changes are occurring. At present, it is believed that concurrently with the removal of the organic amide and organic solvent, a particular physical structure of the film forms to some extent, i.e., the film becomes physically organized. However, when the cast membrane is immersed in water, such organizing process is halted and the specific physical structure of the membrane is fixed. Thus, the evaporating step involves not only the removal of the liquid amide and organic solvent from the cast membrane, but also a time period within which the cast membrane achieves a specific physical structure which is fixed by immersion in water. In addition, it has been found that the evaporation period can be very short, i.e., about ¼ to ½ minute, and upon immersion, an operative membrane is determined to a great extent by immersion and possibly largely by immersion.

Other specific embodiments of the present invention will be obvious to one skilled in the art in view of this disclosure. For example, a pore-producing salt or pore-regulating salt, such as disclosed in the earlier copending applications, may be added to the casting solutions, such as illustrated in Table I. Also, the cast membrane may be treated by immersing it in a cold solution of an inorganic treating salt, with such solution preferably being below about 0° C., with the preferred temperature being about −50 C., as disclosed in the earlier copending applications.

There are many features in the present invention which clearly show the significant advance it represents over the prior art. Consequently only a few of the more outstanding features will be pointed out to illustrate the unexpected and unusual results attained by this invention. One of the features of the present invention is the simplicity of preparation of the membrane wherein only a few components are required in the casting solution and the casting and evaporation may be done at ambient temperatures. Thus, contrary to applicants' earlier work in this area, neither a pore-producing salt nor water is required and cooling below room temperature is also not required. Another feature of the present invention is that it utilizes a new class of compounds to produce the desired membrane, i.e., the water-soluble liquid amides which may be used either alone low room temperature is also not required. Another feature of the present invention is that the membrane produced by the process disclosed is unusually homogeneous in structure so that it achieves a uniform physical strength and is particularly durable in use.

It will be understood that the foregoing description and examples are only illustrative of the present invention and it is not intended that the invention be limited thereto. All substitutions, alterations and modifications of the present invention which come within the scope of the following claims or to which this invention is readily susceptible without departing from the spirit and scope of this disclosure are considered part of the present invention.

We claim:

1. A method of preparing a semipermeable membrane adapted to permit substantially selective diffusion therethrough of a component of a solution comprising:
   (a) dissolving
      (I) a cellulosic derivative from the class consisting of the ester and ether cellulosic derivatives having the formula

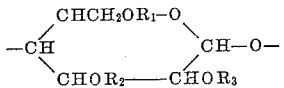

wherein $R_1$, $R_2$ and $R_3$ are members of a group consisting of $R_4$ and $CR_5O$, wherein $R_4$ is an alkyl group containing 1 to 8 carbon atoms and $R_5$ is an alkyl group containing 1 to 7 carbon atoms and (II) a substantially water-soluble liquid amide having the formula $R_6CONR_7R_8$ wherein $R_6$ is from the class consisting of hydrogen, methyl and ethyl groups and $R_7$ and $R_8$ are from the class consisting of hydrogen, methyl, ethyl and propyl groups,
   in an organic solvent
   (b) casting said solution to form a membrane;
   (c) evaporating a portion of said organic solvent for a period of time sufficient to transform the cast solution into a membrane having a specific physical structure;
   (d) immersing the cast membrane in water; and
   (e) heating the cast membrane to reduce its porosity.

2. A method as stated in claim 1 wherein said cellulosic derivative is a member of the class consisting of cellulose acetate, cellulose acetate-butyrate, cellulose propionate and ethyl cellulose.

3. A method as stated in claim 1 wherein said liquid amide is formamide.

4. A method as stated in claim 1 wherein said liquid amide is dimethyl formamide.

5. A method as stated in claim 1 wherein the cellulosic derivative has a concentration in said solution in the range of about 20% to 30% by weight and the liquid amide has a concentration in the range of about 10% to 40% by weight.

6. A method as stated in claim 1 wherein the time period for said evaporation is in the range of about ¼ to 15 minutes and such time period is inversely proportional to the temperature at which the membrane is cast and evaporated.

7. A method as stated in claim 1 wherein said heating is done in water to a temperature in the range of about 23° C. to 95° C.

8. A method of preparing a semipermeable membrane adapted to permit substantially selective diffusion therethrough of a component of a solution comprising:
   (a) dissolving
      (I) a cellulosic derivative having the formula

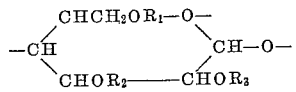

wherein $R_1$, $R_2$ and $R_3$ are members of a group consisting of $R_4$ and $CR_5O$, wherein $R_4$ is an alkyl group containing 1 to 8 carbon atoms and $R_5$ is an alkyl group containing 1 to 7 carbon atoms (II) a substantially water-soluble liquid amide which is a solvent for cellulose acetate having the formula $RCONR_7R_8$ wherein $R_6$ is from the class consisting of hydrogen, methyl and ethyl groups and $R_7$ and $R_8$ are from the class consisting of hydrogen, methyl, ethyl and propyl groups without both being hydrogen;
   (b) casting said solution to form a membrane;
   (c) evaporating a portion of said liquid amide for a period of time sufficient to transform the cast solution into a membrane having a specific physical structure;
   (d) immersing the cast membrane in water; and
   (e) heating the cast membrane to reduce its porosity.

9. A method as stated in claim 7 wherein said cellulosic derivative is a member of the class consisting of cellulose acetate, cellulose acetate-butyrate, cellulose propionate and ethyl cellulose.

10. A method as stated in claim 8 wherein said liquid amide is dimethyl formamide.

11. A method as stated in claim 8 wherein the weight ratio of liquid amide to cellulosic derivative in the casting solution is in the range of about 2/1 to 4/1.

12. A method as stated in claim 8 wherein the time period for said evaporation is in the range of about 4 to 15 minutes.

13. A method as stated in claim 8 wherein said heating is done in water to a temperature in the range of about 70° C. to 95° C.

References Cited

UNITED STATES PATENTS

| | | | |
|---|---|---|---|
| 2,926,104 | 2/1960 | Goetz | 264—207 |
| 3,026,571 | 3/1962 | Maier | 264—53 XR |
| 3,133,132 | 5/1964 | Loeb et al. | 264—49 |

FOREIGN PATENTS 203,713  10/1924  Great Britain.

ALEXANDER H. BRODMERKEL, *Primary Examiner.*

P. E. ANDERSON, *Assistant Examiner.*

UNITED STATES PATENT OFFICE
CERTIFICATE OF CORRECTION

Patent No. 3,344,214

September 26, 1967

Serop Manjikian et al.

It is certified that error appears in the above identified patent and that said Letters Patent are hereby corrected as shown below:

Column 8, line 32, "RCONR$_7$R$_8$" should read -- R$_6$CONR$_7$R$_8$ --.

Signed and sealed this 29th day of July 1969.

(SEAL)
Attest:

Edward M. Fletcher, Jr.
Attesting Officer

WILLIAM E. SCHUYLER, JR.
Commissioner of Patents